United States Patent [19]
Aronie

[11] Patent Number: 5,054,658
[45] Date of Patent: Oct. 8, 1991

[54] MORTAR DISPENSER

[76] Inventor: Alan B. Aronie, 27 Seymour St., Concord, Mass. 01742

[21] Appl. No.: 424,133

[22] Filed: Oct. 19, 1989

[51] Int. Cl.⁵ .............................................. G01F 11/00
[52] U.S. Cl. ................................... 222/232; 222/240; 222/342; 198/671; 198/676
[58] Field of Search ............... 222/200, 342, 406, 413, 222/228, 232, 148, 240; 198/498, 662, 671, 676

[56] References Cited

U.S. PATENT DOCUMENTS

| | | | |
|---|---|---|---|
| 532,645 | 1/1895 | Cushing et al. ..................... | 401/149 |
| 2,279,640 | 4/1942 | Ringmarck ...................... | 222/342 X |
| 2,694,609 | 11/1954 | Vita .................................. | 222/324 |
| 2,794,577 | 6/1957 | Van Leeuwen ................ | 222/232 X |
| 2,908,425 | 10/1959 | Denson .............................. | 222/262 |
| 3,155,288 | 11/1964 | Landgraf ........................ | 222/232 X |
| 3,253,892 | 5/1966 | Brignac et al. ................. | 198/676 X |
| 3,411,213 | 11/1968 | Spinello ................................. | 32/60 |
| 3,605,995 | 9/1971 | Maack .............................. | 198/676 X |
| 3,750,905 | 8/1973 | Wolfrom .............................. | 222/23 |
| 4,850,515 | 7/1989 | Cleland ........................... | 198/671 X |
| 4,949,879 | 8/1990 | Mariotti ......................... | 222/240 X |

FOREIGN PATENT DOCUMENTS 981141 12/1982 U.S.S.R. ............................. 222/342

Primary Examiner—Michael S. Huppert
Assistant Examiner—Gregory L. Huson
Attorney, Agent, or Firm—Henry D. Pahl, Jr.

[57] ABSTRACT

The mortar dispenser disclosed herein utilizes a rotating auger extending through a feed barrel at the bottom of a supply hopper to force mortar through a nozzle attached to the barrel for use in tuck pointing. Formation of a rotating plug which would obstruct flow is prevented by an auger construction in which a single helical flute divides into a pair of flutes which, in the nozzle region, extend in opposite directions from the auger axis to provide two channels. The pair of flutes are apertured to permit mortar flow between the two channels and a slender elongate spring scraper prevents mortar from sticking to the nozzle. An agitator extending into the hopper is driven by a cam rotating with the auger so as to work mortar in the hopper and cause it to flow into the auger.

4 Claims, 2 Drawing Sheets

MORTAR DISPENSER

BACKGROUND OF THE INVENTION

The present invention relates to a portable mortar dispenser and more particularly to such a dispenser which provides an even and continuous flow of mortar under pressure suitable for the tuck pointing of masonry.

It has previously been proposed to employ gun-type dispenser for feeding mortar through a nozzle as an aid in tuck pointing. Such a gun-type dispenser is, for example, proposed in U.S. Pat. No. 2,908,425 issued to J. F. Denson. Somewhat similar constructions are shown in U.S. patents 2,694,509 and 3,750,905. Such prior proposals, however, have not found any wide acceptance and this failure is believed to be due to difficulties in causing mortar to feed smoothly and particularly its tendency to form a rotating plug which blocks flow through the nozzle.

Among the several objects of the present invention may be noted the provision of a mortar dispenser which will provide a smooth and even flow of mortar suitable for tuck pointing; the provision of such a dispenser which avoids clogging or jamming; the provision of such a dispenser which is easily used; the provision of such a dispenser which is easily cleaned; the provision of such a dispenser which is highly reliable and which is of relatively simple and inexpensive construction. Other objects and features will be in part apparent and in part pointed out hereinafter.

SUMMARY OF THE INVENTION

The portable mortar dispenser of the present invention employs a generally vertical hopper for holding mortar to be dispensed. A tubular feed barrel extends from the bottom of the hopper and a nozzle is releasably mounted at the end of the barrel. A feed auger extends along the bottom of the hopper, through the barrel and into the nozzle. The portion of the auger within the hopper utilizes a single helical flute extending radially from the auger axis but, toward the nozzle, the single flute divides into a pair of helical flutes which extend in opposite directions from the auger axis. Preferably, the pair of flutes are perforate in the region of the nozzle and the auger further includes a narrow elongate spring scraper which keeps mortar from sticking to the nozzle. In accordance with another aspect of the invention, an agitator is provided for working mortar in the hopper thereby to cause mortar to flow smoothly into the auger.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
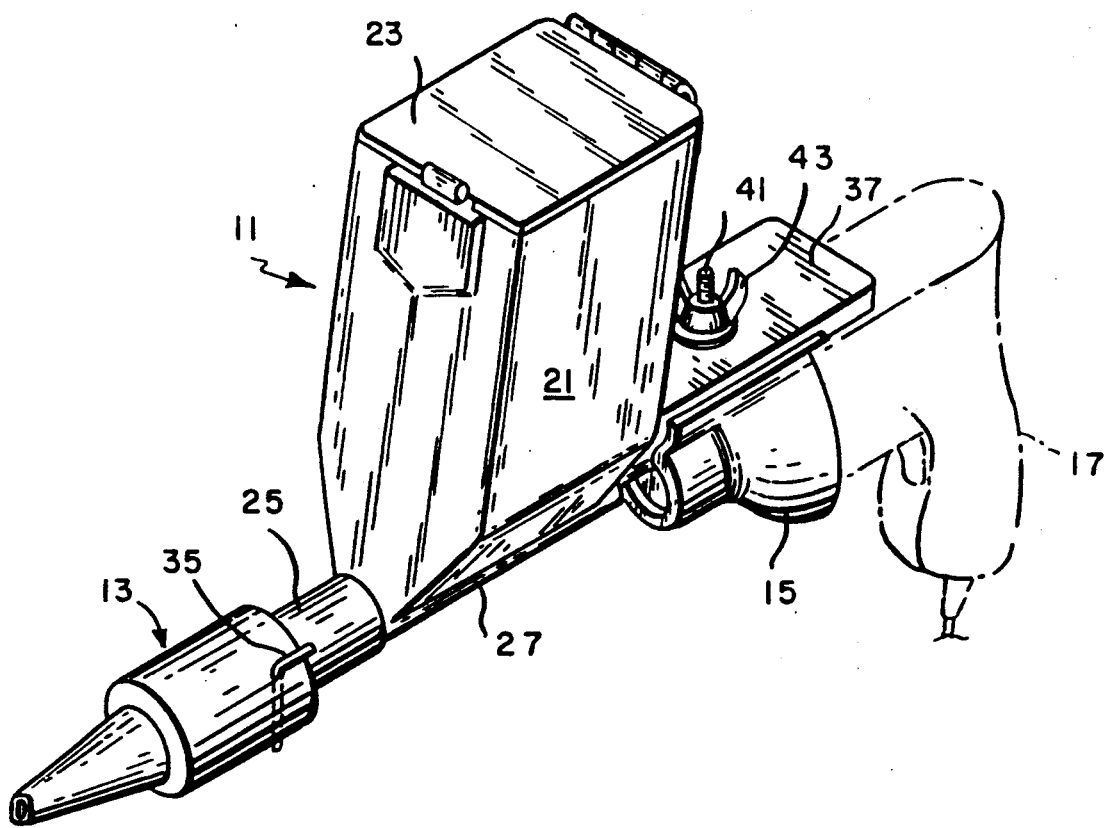
FIG. 1 is an overall view, in perspective, of a mortar dispenser in accordance with the present invention.

Referring now to FIG. 1, the mortar dispensing apparatus illustrated there is constructed in three general sections, a hopper and feed barrel body 11, a nozzle 13 and an adapter collar 15 which allows the dispenser to utilize a conventional electric hand drill as a motive source, the electric hand drill being indicated generally by reference character 17. Except for various internal elements described hereinafter, the main structures of the body 11, the nozzle 13 and the adapter 15 may be molded from a suitable plastic resin, e.g. lexan or fiberglas reinforced epoxy.

Figure 2:
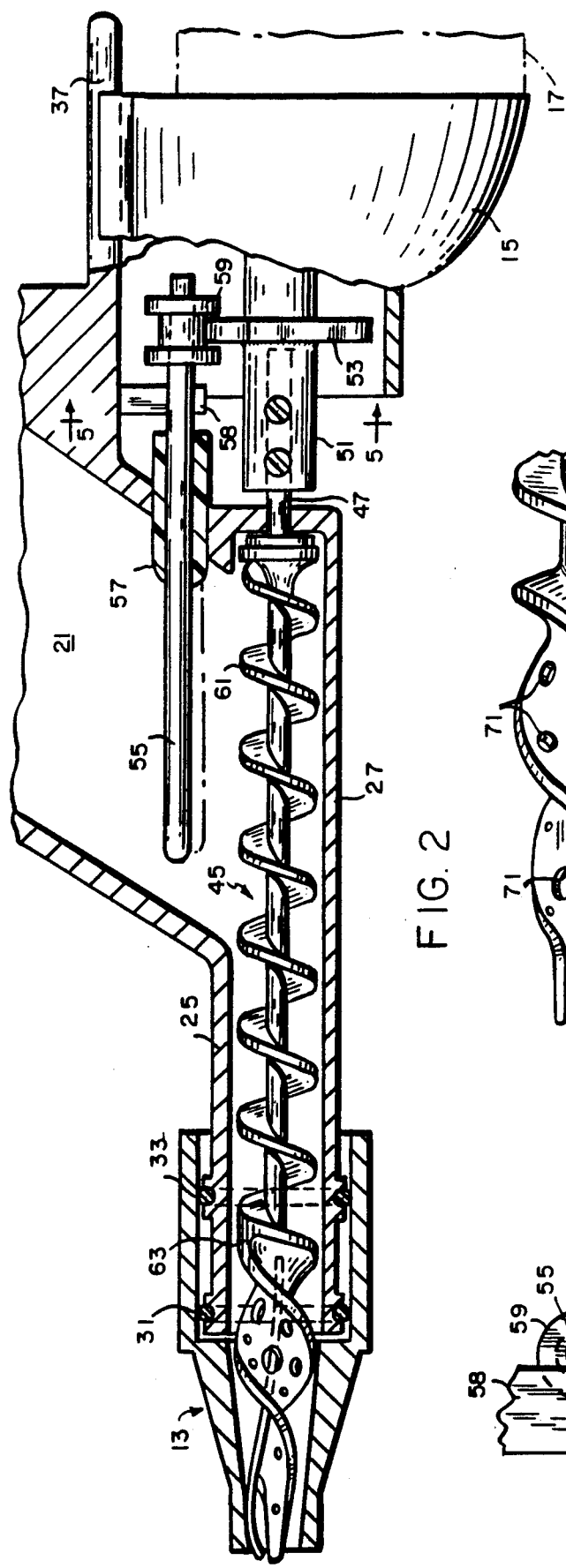
FIG. 2 is a side view, in section, of the mortar dispenser.

As may be seen in FIGS. 1 and 2, a housing body 11 provides a mortar holding hopper 21 which is generally vertically oriented but which has a slight rearward inclination in the particular embodiment shown. Preferably, the hopper is provided with a hinged cover 23 for retaining mortar in the hopper when the dispenser is set down. The hopper housing 11 is provided with a rearwardly extending tang 37 which fits within a channel on the top of the adapter 15. The adapter 15 carries a stud 41 so that the hopper housing can be secured to the adapter by means of a wing nut 43.

Extending horizontally forward from the bottom of the hopper is a generally cylindrical feed cylinder 25, the channel of the cylinder being continued along the bottom of the hopper as indicated by reference character 27. The nozzle 13 fits over the distal end of the barrel 25 and is sealed thereto by a pair of O-rings 31 and 33. The nozzle is releasably retained on the end of the barrel by a key or pin 35 which lies just behind the rim holding the rearmost O-ring 33 so that the nozzle can rotate. Thus, the tip of the nozzle can optionally be provided with transversely elongate or slot-like exit aperture and the exit aperture can be oriented either vertically or horizontally as desired.

Figure 5:
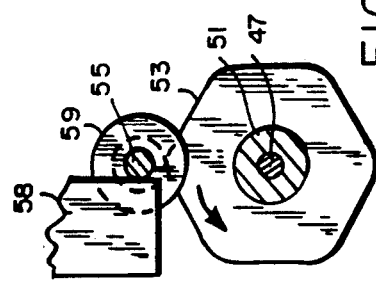
FIG. 5 is a sectional view taken substantially on the line 5—5 of FIG. 2 showing an agitator operating cam.

An auger, designated generally by reference character 45, extends across the bottom of the hopper 21 through the barrel 25 and into the nozzle 13. The right hand end of the auger includes a shaft 47 which extends through an opening in the rear of the body 11. A coupling 51 is provided for connecting the shaft 47 to the output shaft of the electric hand drill 17. Coupling 51 carries a cam 53 which is multi-lobed as may be seen in FIG. 5.

An agitator bar or rod 55 extends through a soft rubber bushing 57 fitting into a hole in the housing 11 slightly above the auger shaft 47 so that the rod is freely pivotable for small displacements. The exterior portion of the rod 55 carries a spool-like cam follower 59 which cooperates with the cam 53 to oscillate the agitator rod when the auger 45 is rotating. The corresponding oscillation of the inner end of the rod 55 works mortar in the hopper 21 causing it to flow relatively freely into the channel of the portion of the auger at the bottom of the hopper. The housing provides a rubbing block or post 58 which limits sideways motion of the rod. Preferred types of mortar are types N and O as designated in the Uniform Building Code, augmented by a pumping aid such as that sold under the tradename Darex by W. R. Grace and Co. of 62 Whittemore Avenue, Cambridge, Massachusetts.

As indicated previously, the portion of the auger at the bottom of the hopper 21 comprises but a single helical flute extending radially from the axis of the auger. This flute is designated by reference character 61.

Thus in the region of the hopper, the auger provides but a single channel for mortar being advanced by rotation of the auger. Adjacent the nozzle 13, however, the single flute divides into a pair of flutes so that there are, in effect, two channels defined. The region of this dividing is designated generally by reference character 63. After a short distance, during which the two flutes progressively separate, they in effect extend in opposite directions from the axis of the auger.

Once they are opposite to each other, the two flutes may, in one sense, be seen as opposite edges of a single twisted ribbon. However, since the flutes extend in both directions from the axis of the auger, it will be understood that there are in fact two channels defined by the auger in this region, i.e. within the nozzle section of the mortar path. As may also be seen, one of the channels is essentially blind or closed off at its right hand end, as viewed in the drawings, and thus is not initially filled with mortar.

The twisted ribbon defining the pair of flutes is provided with a plurality of apertures, i.e. as indicated by reference characters 71. As pressure builds up in the initially open channel during the passage of mortar through the converging throat of the nozzle 13, this pressure is to some extent relieved by extruding of the mortar through the aperatures 71. This action, together with the dividing of the flute, is believed to inhibit the formation of a rotating solid plug which obstructs flow of the mortar out through the nozzle.

Figure 3:
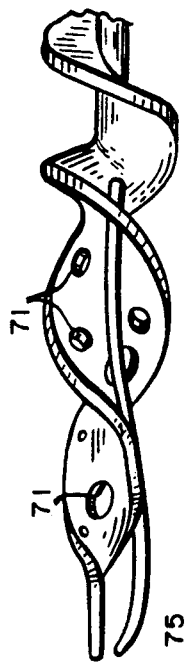
FIG. 3 is an enlarged view of the distal tip of an auger employed in the construction of FIG. 2.
Figure 4:
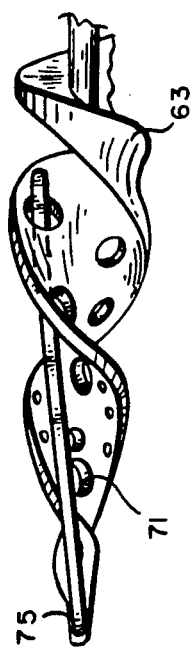
FIG. 4 is another view of the auger tip in a different orientation.

Formation of a rotating plug in the nozzle is further inhibited by a thin elongate spring scraper, designated generally by reference character 75. As may be seen in FIGS. 3 and 4, the right hand end of the spring scraper 75 extends through one of the apertures 71, lies in one of the channels for a short distance and then bows outwardly essentially into contact with the inner surface of the nozzle 13 close to the exit port. This spring scraper inhibits sticking of mortar to the nozzle. As will be understood, the spring scraper 75 is subject to wear due to the abrasive nature of the mortar but is relatively easily replaced since, with the nozzle removed, the scraper can be withdrawn axially by merely overcoming a small spring force.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A portable mortar dispenser for tuck pointing which comprises:
   a generally vertical hopper for holding mortar to be dispensed;
   a tubular feed barrel extending from the bottom of said hopper;
   a nozzle on the distal end of said barrel;
   a feed auger extending along the bottom of said hopper, through said barrel and into said nozzle, said auger including a driving shaft which extends out of the hopper opposite said feed barrel;
   coupling means for connecting said shaft to motor means for rotating the auger;
   a cam carried by the coupling means;
   an agitator rod pivotally mounted on and extending through a portion of said hopper above said shaft;
   a cam follower carried on said agitator rod and engaging said cam for oscillating said agitator rod during rotation of said auger.

2. A portable mortar dispenser for tuck pointing which comprises:
   a generally vertical hopper for holding mortar to be dispensed;
   a tubular feed barrel extending from the bottom of said hopper;
   a nozzle releasably mounted on the distal end of said barrel;
   a feed auger extending along the bottom of said hopper, through said barrel and into said nozzle, the portion of said auger within said hopper comprising a single helical flute extending radially from the auger axis, said single flute dividing into a pair of helical flutes which, in the nozzle, extend in opposite directions from the auger axis, said auger including a driving shaft which extends out of the hopper opposite said feed barrel;
   coupling means for connecting said shaft to motor means for rotating the auger;
   a cam carried by the coupling means;
   an agitator rod pivotally mounted on and extending through a portion of said hopper above said shaft;
   a cam follower carried on said agitator rod and engaging said cam for oscillating said agitator rod during rotation of said auger.

3. A dispenser as set forth in claim 2 wherein said pair of flutes are perforate in the region of said nozzle.

4. A dispenser as set forth in claim 3 further comprising a narrow, elongate spring scraper which extends from an aperture in said pair of flutes toward the periphery of the tip of said nozzle.

* * * * *